(12) United States Patent
Brown et al.

(10) Patent No.: US 12,253,444 B2
(45) Date of Patent: *Mar. 18, 2025

(54) FLOW DEVICE AND ASSOCIATED METHOD AND SYSTEM

(71) Applicant: Honeywell International Inc., Charlotte, NC (US)

(72) Inventors: Andy Walker Brown, Richardson, TX (US); Adam D. McBrady, Dallas, TX (US); Ryadh Abdullah Zakaria, Waterlooville (GB); Stephan Michael Bork, Murphy, TX (US)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/399,419

(22) Filed: Dec. 28, 2023

(65) Prior Publication Data
US 2024/0125676 A1 Apr. 18, 2024

Related U.S. Application Data

(63) Continuation of application No. 17/247,096, filed on Nov. 30, 2020, now Pat. No. 12,000,768, which is a (Continued)

(51) Int. Cl.
*G06T 7/62* (2017.01)
*G01N 1/22* (2006.01)
(Continued)

(52) U.S. Cl.
CPC ....... *G01N 1/2273* (2013.01); *G01N 15/0227* (2013.01); *G06T 7/62* (2017.01);
(Continued)

(58) Field of Classification Search
CPC .. G01N 1/2273; G01N 15/0227; G01N 15/01; G01N 2015/0233; G01N 15/075;
(Continued)

(56) References Cited

U.S. PATENT DOCUMENTS 4,021,117 A * 5/1977 Gohde ............... G01N 15/1456
377/50
4,232,967 A * 11/1980 Grachev ............ G01N 15/0205
356/336

(Continued)

FOREIGN PATENT DOCUMENTS

AU 2018101327 A4 10/2018
CA 2326811 A1 5/2002
(Continued)

OTHER PUBLICATIONS

U.S. Appl. No. 17/247,096, filed Nov. 30, 2020, 2021/0164878, Allowed.
(Continued)

*Primary Examiner* — Roy M Punnoose
(74) *Attorney, Agent, or Firm* — Alston & Bird LLP

(57) ABSTRACT

A flow device, method, and system are provided for determining the fluid particle composition. An example flow device includes a fluid sensor configured to monitor at least one particle characteristic of fluid flowing through the fluid sensor. The example flow device also includes at least one processor configured to, upon determining the at least one particle characteristic satisfies a particle criteria, generate a control signal for an external device. The example flow device also includes a fluid composition sensor configured to be powered based on the control signal and further configured to capture data relating to the fluid particle composition. The example flow device is also configured to generate one or more particle profiles of at least one component of the (Continued)

fluid based on the data captured by the fluid composition sensor.

20 Claims, 7 Drawing Sheets

Related U.S. Application Data continuation of application No. 16/396,524, filed on Apr. 26, 2019, now Pat. No. 10,876,949.

(51) Int. Cl.
   *G01N 15/0227* (2024.01)
   *G06V 10/75* (2022.01)
   *G01N 15/01* (2024.01)

(52) U.S. Cl.
   CPC ............ *G06V 10/751* (2022.01); *G01N 15/01* (2024.01); *G01N 2015/0233* (2013.01)

(58) Field of Classification Search
   CPC ........... G01N 15/1436; G01N 15/1459; G01N 2001/2223; G01N 2001/245; G01N 2015/1486; G01N 2015/1493; G01N 15/00; G01N 15/0205; G06T 7/62; G06V 10/751
   See application file for complete search history.

(56) References Cited

U.S. PATENT DOCUMENTS

| | | | | |
|---|---|---|---|---|
| 4,839,529 | A * | 6/1989 | Fruengel | G01N 15/06 356/339 |
| 5,001,463 | A * | 3/1991 | Hamburger | G01N 1/2205 356/438 |
| 5,040,424 | A | 8/1991 | Marple et al. | |
| 5,257,087 | A * | 10/1993 | Furuya | G01N 15/0205 356/336 |
| 5,404,217 | A | 4/1995 | Janik et al. | |
| 5,426,501 | A * | 6/1995 | Hokanson | G01N 15/1456 250/222.2 |
| 5,440,145 | A | 8/1995 | Cole | |
| 5,646,597 | A * | 7/1997 | Hamburger | G01N 15/0205 340/630 |
| 5,790,246 | A | 8/1998 | Kuhnell et al. | |
| 5,870,189 | A * | 2/1999 | Uesugi | G01N 21/4788 356/370 |
| 5,870,190 | A | 2/1999 | Unger | |
| 5,932,795 | A | 8/1999 | Koutrakis et al. | |
| 6,049,381 | A | 4/2000 | Reintjes et al. | |
| 6,101,886 | A | 8/2000 | Brenizer et al. | |
| 6,115,119 | A | 9/2000 | Sieracki et al. | |
| 6,435,043 | B1 | 8/2002 | Ferguson et al. | |
| 6,463,814 | B1 | 10/2002 | Letarte et al. | |
| 6,562,583 | B1 | 5/2003 | Herbig et al. | |
| 6,629,449 | B1 | 10/2003 | Kline-Schoder et al. | |
| 6,729,196 | B2 | 5/2004 | Moler et al. | |
| 6,887,710 | B2 | 5/2005 | Call et al. | |
| 6,909,269 | B2 | 6/2005 | Nagai et al. | |
| 7,518,710 | B2 | 4/2009 | Gao et al. | |
| 7,633,606 | B2 | 12/2009 | Northrup et al. | |
| 7,762,677 | B2 | 7/2010 | Lundgren | |
| 7,799,567 | B1 | 9/2010 | Call | |
| 7,895,000 | B2 * | 2/2011 | Chandler | G01N 15/0205 377/50 |
| 8,219,249 | B2 * | 7/2012 | Harrod | G06F 8/34 62/155 |
| 8,506,686 | B2 | 8/2013 | Langle et al. | |
| 8,866,063 | B2 | 10/2014 | Ozcan et al. | |
| 9,007,433 | B2 | 4/2015 | Ozcan et al. | |
| 9,057,702 | B2 | 6/2015 | Ozcan et al. | |
| 9,057,708 | B2 | 6/2015 | Kurosawa et al. | |
| 9,146,246 | B2 | 9/2015 | Battrell et al. | |
| 9,170,599 | B2 | 10/2015 | Ozcan et al. | |
| 9,202,835 | B2 | 12/2015 | Ozcan | |
| 9,254,500 | B2 | 2/2016 | Linnell et al. | |
| 9,423,335 | B2 | 8/2016 | Gabriel | |
| 9,715,099 | B2 | 7/2017 | Ozcan et al. | |
| 9,743,909 | B1 | 8/2017 | Sapozhnikov et al. | |
| 9,772,281 | B2 | 9/2017 | Bertaux | |
| 9,933,351 | B2 | 4/2018 | Kent et al. | |
| 9,952,191 | B2 | 4/2018 | Crisp | |
| 10,066,985 | B2 | 9/2018 | Stephen | |
| 10,281,371 | B2 | 5/2019 | Hong | |
| 10,317,320 | B2 | 6/2019 | David | |
| 10,684,209 | B1 | 6/2020 | Manautou | |
| 10,718,703 | B2 * | 7/2020 | Pariseau | G01N 15/1459 |
| 10,794,810 | B1 | 10/2020 | Brown et al. | |
| 10,816,445 | B2 | 10/2020 | Kelly et al. | |
| 10,876,949 | B2 * | 12/2020 | Brown | G01N 15/0227 |
| 11,221,288 | B2 | 1/2022 | Brown et al. | |
| 11,662,542 | B2 | 5/2023 | Misener et al. | |
| 11,835,432 | B2 | 12/2023 | McBrady et al. | |
| 2002/0124664 | A1 | 9/2002 | Call et al. | |
| 2003/0142310 | A1 | 7/2003 | Bedard et al. | |
| 2004/0011975 | A1 * | 1/2004 | Nicoli | G01N 15/0227 250/574 |
| 2004/0149634 | A1 | 8/2004 | Hughes | |
| 2004/0237671 | A1 | 12/2004 | Ryan | |
| 2005/0106739 | A1 | 5/2005 | Cabuz et al. | |
| 2005/0214745 | A1 | 9/2005 | Ryan | |
| 2005/0255001 | A1 | 11/2005 | Padmanabhan et al. | |
| 2006/0073585 | A1 | 4/2006 | McDevitt et al. | |
| 2006/0234621 | A1 * | 10/2006 | Desrochers | F24F 3/044 702/50 |
| 2007/0035738 | A1 | 2/2007 | Bordelon | |
| 2007/0159627 | A1 * | 7/2007 | Johnson | G01N 15/1433 356/335 |
| 2007/0247718 | A1 | 10/2007 | Yoshikawa et al. | |
| 2008/0221812 | A1 * | 9/2008 | Pittaro | G01N 15/14 702/66 |
| 2008/0233636 | A1 | 9/2008 | Ryan | |
| 2009/0021728 | A1 | 1/2009 | Heinz et al. | |
| 2009/0027674 | A1 | 1/2009 | Laudo | |
| 2009/0066934 | A1 | 3/2009 | Gao et al. | |
| 2009/0097124 | A1 | 4/2009 | Lundgren | |
| 2009/0128810 | A1 * | 5/2009 | Bates | G01N 15/1012 356/336 |
| 2009/0219530 | A1 * | 9/2009 | Mitchell | G01N 15/1433 356/336 |
| 2010/0101301 | A1 | 4/2010 | McBrady et al. | |
| 2010/0285606 | A1 | 11/2010 | Phillips et al. | |
| 2011/0031394 | A1 | 2/2011 | Knowles et al. | |
| 2011/0136165 | A1 | 6/2011 | Vojnovic et al. | |
| 2011/0195857 | A1 | 8/2011 | Selinfreund et al. | |
| 2011/0286884 | A1 | 11/2011 | Eickhoff et al. | |
| 2012/0096925 | A1 | 4/2012 | Hansen et al. | |
| 2012/0135510 | A1 | 5/2012 | Gordon et al. | |
| 2012/0255375 | A1 | 10/2012 | Kwok et al. | |
| 2012/0312072 | A1 | 12/2012 | Stringham et al. | |
| 2012/0315666 | A1 | 12/2012 | Fujioka et al. | |
| 2013/0142708 | A1 | 6/2013 | Battrell et al. | |
| 2013/0220034 | A1 | 8/2013 | Peters et al. | |
| 2013/0280752 | A1 | 10/2013 | Ozcan et al. | |
| 2013/0293873 | A1 | 11/2013 | Bentien | |
| 2014/0123730 | A1 | 5/2014 | Yamasaki et al. | |
| 2014/0146157 | A1 | 5/2014 | Duplisea et al. | |
| 2014/0227723 | A1 | 8/2014 | Ingber et al. | |
| 2014/0234865 | A1 * | 8/2014 | Gabriel | G01N 33/5044 356/338 |
| 2014/0268105 | A1 | 9/2014 | Bills et al. | |
| 2015/0075301 | A1 | 3/2015 | Scialo et al. | |
| 2015/0099272 | A1 * | 4/2015 | Hwang | C12Q 1/04 435/34 |
| 2015/0143929 | A1 | 5/2015 | Volckens et al. | |
| 2015/0177143 | A1 | 6/2015 | Fujita et al. | |
| 2015/0186842 | A1 | 7/2015 | Daniarov | |
| 2015/0260617 | A1 | 9/2015 | Ketcham et al. | |
| 2015/0323941 | A1 * | 11/2015 | Pariseau | G05D 23/19 236/1 C |
| 2015/0355000 | A1 | 12/2015 | Bates et al. | |

(56) References Cited

U.S. PATENT DOCUMENTS

| | | | |
|---|---|---|---|
| 2015/0355084 A1 | 12/2015 | White | |
| 2016/0116404 A1 | 4/2016 | Bertaux | |
| 2016/0223435 A1 | 8/2016 | Takenaka et al. | |
| 2016/0290912 A1 | 10/2016 | Kent et al. | |
| 2016/0290916 A1 | 10/2016 | Ben et al. | |
| 2017/0016824 A1 | 1/2017 | Tucker et al. | |
| 2017/0123114 A1 | 5/2017 | Stephen | |
| 2017/0200197 A1 | 7/2017 | Brubaker | |
| 2017/0219464 A1 | 8/2017 | Houghton et al. | |
| 2017/0242234 A1 | 8/2017 | Ashcroft et al. | |
| 2017/0370809 A1* | 12/2017 | Miller-Lionberg | G01N 15/0618 |
| 2018/0052425 A1 | 2/2018 | Ozcan et al. | |
| 2018/0054425 A1 | 2/2018 | Abbott | |
| 2018/0088020 A1 | 3/2018 | Couderc | |
| 2018/0168490 A1 | 6/2018 | Jones et al. | |
| 2018/0258469 A1* | 9/2018 | Johnson-Buck | C12Q 1/6876 |
| 2018/0259429 A1 | 9/2018 | Adams | |
| 2018/0321126 A1 | 11/2018 | Manautou et al. | |
| 2019/0095586 A1* | 3/2019 | McBrady | G16H 10/60 |
| 2019/0265153 A1 | 8/2019 | Rottenberg | |
| 2019/0293539 A1 | 9/2019 | Manautou et al. | |
| 2019/0294108 A1* | 9/2019 | Ozcan | G06V 10/82 |
| 2019/0331581 A1 | 10/2019 | Ikehata et al. | |
| 2019/0336050 A1 | 11/2019 | Deck et al. | |
| 2019/0346356 A1 | 11/2019 | Karnik et al. | |
| 2020/0103328 A1 | 4/2020 | Ozcan et al. | |
| 2020/0110018 A1 | 4/2020 | Ryadinskiy et al. | |
| 2020/0240894 A1 | 7/2020 | Isaacman-Vanwertz et al. | |
| 2020/0340901 A1 | 10/2020 | Ozcan et al. | |
| 2020/0353166 A1 | 11/2020 | Brown et al. | |
| 2021/0116339 A1 | 4/2021 | Nishikawa et al. | |
| 2021/0164878 A1 | 6/2021 | Brown et al. | |
| 2021/0255014 A1 | 8/2021 | Speldrich et al. | |
| 2021/0255068 A1 | 8/2021 | Collins et al. | |
| 2021/0255080 A1 | 8/2021 | Myers et al. | |
| 2021/0255081 A1 | 8/2021 | Myers et al. | |
| 2021/0278321 A1 | 9/2021 | Carlson et al. | |
| 2022/0065780 A1 | 3/2022 | Myers et al. | |
| 2022/0357261 A1 | 11/2022 | Brown et al. | |
| 2022/0364973 A1 | 11/2022 | Myers et al. | |

FOREIGN PATENT DOCUMENTS

| | | | |
|---|---|---|---|
| CN | 1695771 A | 11/2005 | |
| CN | 103270404 A | 8/2013 | |
| CN | 103418295 A | 12/2013 | |
| CN | 104081200 A | 10/2014 | |
| CN | 204073666 U | 1/2015 | |
| CN | 105829860 A | 8/2016 | |
| CN | 106323825 A | 1/2017 | |
| CN | 107208478 A | 9/2017 | |
| CN | 107466364 A | 12/2017 | |
| CN | 109578599 A | 4/2019 | |
| CN | 110402154 A | 11/2019 | |
| CN | 110603069 A | 12/2019 | |
| CN | 111272639 A | 6/2020 | |
| CN | 114127537 A | 3/2022 | |
| EP | 2239557 A1 | 10/2010 | |
| EP | 2413293 A1 | 2/2012 | |
| EP | 1904826 B1 | 2/2019 | |
| EP | 3771898 A1 | 2/2021 | |
| JP | 06-511554 A | 12/1994 | |
| JP | 2003-075353 A | 3/2003 | |
| JP | 2005-534946 A | 11/2005 | |
| JP | 2007-101331 A | 4/2007 | |
| JP | 2007-147437 A | 6/2007 | |
| JP | 2009-025191 A | 2/2009 | |
| JP | 2010-145310 A | 7/2010 | |
| JP | 2011-502256 A | 1/2011 | |
| JP | 2011-139656 A | 7/2011 | |
| JP | 2014-095571 A | 5/2014 | |
| JP | 2019-511707 A | 4/2019 | |
| WO | 2006/013573 A2 | 2/2006 | |
| WO | 2012/081285 A1 | 6/2012 | |
| WO | 2013/118259 A1 | 8/2013 | |
| WO | 2014/156797 A1 | 10/2014 | |
| WO | 2015/029673 A1 | 3/2015 | |
| WO | 2015/049759 A1 | 4/2015 | |
| WO | 2016/073745 A2 | 5/2016 | |
| WO | 2016/147018 A1 | 9/2016 | |
| WO | 2016/201113 A1 | 12/2016 | |
| WO | 2017/051180 A1 | 3/2017 | |
| WO | 2017/163650 A1 | 9/2017 | |
| WO | 2017/196885 A1 | 11/2017 | |
| WO | 2017/196995 A1 | 11/2017 | |
| WO | 2018/117146 A1 | 6/2018 | |
| WO | 2018/165590 A1 | 9/2018 | |
| WO | 2018/176060 A1 | 9/2018 | |
| WO | 2019/097523 A1 | 5/2019 | |
| WO | 2019/165590 A1 | 9/2019 | |
| WO | 2019/210375 A1 | 11/2019 | |
| WO | 2020/072234 A1 | 4/2020 | |
| WO | 2020/160158 A1 | 8/2020 | |
| WO | 2021/034948 A1 | 2/2021 | |

OTHER PUBLICATIONS

U.S. Appl. No. 16/396,524, filed Apr. 26, 2019, U.S. Pat. No. 10,876,949, Issued.

CN Office Action, including Search Report Mailed on Aug. 23, 2024 for CN Application No. 202110188303, 6 page(s).

English Translation of CN Office Action dated Aug. 23, 2024 for CN Application No. 202110188303, 4 page(s).

English translation of CN Search report dated Aug. 23, 2024 for CN Application No. 202110188303, 2 page(s).

Notice of Allowance and Fees Due (PTOL-85) Mailed on Mar. 2, 2022 for U.S. Appl. No. 16/790,924.

Notice of Allowance and Fees Due (PTOL-85) Mailed on Nov. 22, 2023 for U.S. Appl. No. 17/247,096, 10 page(s).

Notice of Allowance and Fees Due (PTOL-85) Mailed on Oct. 19, 2023 for U.S. Appl. No. 17/674,325, 9 page(s).

Notice of Allowance and Fees Due (PTOL-85) Mailed on Oct. 24, 2022 for U.S. Appl. No. 17/805,072.

Notice of Allowance and Fees Due (PTOL-85) Mailed on Sep. 8, 2020 for U.S. Appl. No. 16/396,524.

Notice of Allowance and Fees Due (PTOL-85) Mailed on Sep. 8, 2020 for U.S. Appl. No. 16/396,524, 7 page(s).

Notice of Allowance for U.S. Appl. No. 16/530,496 dated Jun. 2, 2020, 25 pages.

Notice of Allowance received for Chinese Patent Application No. 202010767051.2, mailed on Mar. 17, 2022, 6 pages (2 pages of English Translation and 4 pages of Original Document).

Notice of Allowance received for U.S. Appl. No. 16/748,543, mailed on Aug. 24, 2021, 10 pages.

Notice of Allowance received for U.S. Appl. No. 16/790,923, mailed on Nov. 23, 2021, 7 pages.

Notice of Allowance received for U.S. Appl. No. 16/790,924, mailed on Mar. 2, 2022, 14 pages.

Notice of Allowance received for U.S. Appl. No. 17/028,635, mailed on Jan. 14, 2022, 8 pages.

Notice of Allowance received for U.S. Appl. No. 17/247,096, mailed on Feb. 18, 2022, 9 pages.

Office Action for China Application No. 202010341234.8 issued Jan. 4, 2023.

Office Action for CN Application No. 202010341234.8 issued Jan. 1, 2023.

Office Action for U.S. Appl. No. 16/396,524 dated Jun. 1, 2020, 13 pages.

Office Action issued in Chinese Application No. 202010767051.2 on Jan. 6, 2022, 3 pages.

Office Action issued in Chinese Application No. 202010767051.2 on Jul. 27, 2021, 13 pages.

Proceedings of the Academic Annual Meeting of the Society of Environmental Science, vol. 3, pp. 2048-2053, Jun. 30, 2012.

Requirement for Restriction/Election Mailed on Apr. 7, 2023 for U.S. Appl. No. 17/247,096, 8 page(s).

(56) References Cited

OTHER PUBLICATIONS

Requirement for Restriction/Election Mailed on Sep. 30, 2022 for U.S. Appl. No. 17/314,420.
Sampling Cassettes & Supplies, [online], [retrieved Nov. 3, 2020_ <URL:https://www.emssales.net/cassettes-supplies.html> (5 pages).
Schneider et al., Fast Particle Characterization Using Digital Holography and Neural Networks, 2016, [online article] [retrieved on Mar. 25, 2020] retrieved from the Internet URL: https://www.ncbi.nlm.nih.gov/pubmed/26835632, 7 pages.
Unpublished U.S. Appl. No. 62/837,066, filed Apr. 22, 2019, entitled "System and Method for Deep Learning-Based Color Holographic Microscopy".
Unpublished U.S. Appl. No. 62/838,149, filed Apr. 24, 2019, entitled "Label-Free Bio-Aerosol Sensing Using Mobile Microscopy and Deep Learning".
Wallace, J. Kent, et al., "Robust, compact implementation of an off-axis digital holographic microscope", Optics Express, Jun. 29, 2015, pp. 17367-17378. vol. 23, No. 13.
Wu et al., Label-Free Bioaerosol Sensing Using Mobile Microscopy and Deep Learning, [article, online], 2018, [retrieved Jul. 25, 2019], <URL: https://www.semanticscholar.org/paper/Label-Free-Bioaerosol-Sensing-Using-Mobile-and-Deep-Wu-Calis/fff5dc6d661ab985c3d14ec04fb84907d7750ab7>, 16 pages.
European search report Mailed on Jan. 12, 2023 for EP Application No. 22169769, 15 page(s).
European Search Report Mailed on Jan. 14, 2022 for EP Application No. 21193185.2, 10 page(s).
European Search Report Mailed on Jul. 14, 2021 for EP Application No. 21156433.1, 7 page(s).
European Search Report Mailed on Jul. 19, 2021 for EP Application No. 21155330, 11 page(s).
European search report Mailed on Jul. 21, 2023 for EP Application No. 23160818, 11 page(s).
European Search Report Mailed on Jul. 26, 2021 for EP Application No. 21151236.3, 14 page(s).
European Search Report Mailed on Jul 9, 2021 for EP Application No. 21154848.2, 14 page(s).
European Search Report Mailed on Mar. 3, 2022 for EP Application No. 21195550, 9 page(s).
European Search Report Mailed on Mar. 14, 2022 for EP Application No. 21200821.
European Search Report Mailed on Mar. 22, 2022 for EP Application No. 21204589.2, 10 page(s).
European search report Mailed on Oct. 10, 2022 for EP Application No. 22169769, 18 page(s).
European Search Report Mailed on Oct. 18, 2022 for EP Application No. 22183226.
European Search Report Mailed on Sep. 10, 2020 for EP Application No. 20170458.2, 8 page(s).
Examiner Interview Summary Record (PTOL-413) Mailed on Apr. 27, 2021 for U.S. Appl. No. 16/748,543.
Examiner Interview Summary Record (PTOL-413) Mailed on Jul. 17, 2023 for U.S. Appl. No. 17/247,096, 1 page(s).
Examiner Interview Summary Record (PTOL-413) Mailed on Jul. 24, 2023 for U.S. Appl. No. 17/314,420, 1 page(s).
Extended European Search Report for Patent Application No. 20170458.2 dated Sep. 10, 2020, 8 pages.
Extended European Search Report issued in European Application No. 20188262.8 on Dec. 8, 2020, 5 pages.
Extended European Search Report issued in European Application No. 21151236.3 on Jul. 26, 2021, 14 pages.
Extended European Search Report issued in European Application No. 21156433.1 on Jul. 14, 2021, 7 pages.
Extended European Search Report Mailed on Jan. 14, 2022 for EP Application No. 21193185.2, 10 pages.
Final Office Action Mailed on Mar. 3, 2023 for U.S. Appl. No. 17/247,096.
Final Rejection Mailed on Apr. 11, 2023 for U.S. Appl. No. 17/410,682, 9 page(s).
Final Rejection Mailed on Mar. 3, 2023 for U.S. Appl. No. 17/247,096, 8 page(s).
Final Rejection Mailed on May 15, 2023 for U.S. Appl. No. 17/314,420, 11 page(s).
HPM Series Particulate Matter Sensors, [article, online], 2019, [retrieved Jul. 25, 2019] <URL: https://sensing.honeywell.com/sensors/particulate-sensors/hpm-series, 11 pages.
Intention to grant Mailed on Dec. 15, 2023 for EP Application No. 21156433, 9 page(s).
Intention to grant Mailed on Jul. 25, 2023 for EP Application No. 21154848, 9 page(s).
Intention to grant Mailed on May 4, 2023 for EP Application No. 20188262, 17 page(s).
JP Decision to Grant Mailed on Apr. 22, 2022 for JP Application No. 2021016701.
JP Decision to Grant Mailed on Oct. 17, 2023 for JP Application No. 2022117842, 3 page(s).
JP Notice of Allowance Mailed on May 16, 2023 for JP Application No. 2022113697, 3 page(s).
JP Notice of Allowance, including Search Report Mailed on May 16, 2023 for JP Application No. 2022113697, 3 page(s).
JP Notice of Allowance, including Search Report Mailed on May 28, 2023 for JP Application No. 2021171491, 3 page(s).
JP Office Action Mailed on Apr. 19, 2022 for JP Application No. 2021-017841, 2 page(s).
JP Office Action Mailed on Dec. 13, 2021 for JP Application No. 2021017841.
JP Office Action Mailed on Dec. 17, 2021 for JP Application No. 2021016701.
JP Office Action Mailed on Dec. 21, 2021 for JP Application No. 2021017841.
JP Office Action Mailed on Sep. 20, 2023 for JP Application No. 2022180787, 3 page(s).
JP Office Action Mailed on Sep. 30, 2022 for JP Application No. 2021171491, 3 page(s).
JP Office Action w/English translation Mailed on May 18, 2023 for JP Application No. 2022117842, 5 page(s).
List of references Mailed on Apr. 27, 2021 for U.S. Appl. No. 16/748,543.
List of references Mailed on Aug. 24, 2021 for U.S. Appl. No. 16/748,543.
List of references mailed on May 10, 2022 for U.S. Appl. No. 17/247,096.
Millipore: "Millipore Particle Monitoring Guide," 69 pgs. (1998). [Retrieved from the Internet URL: <http://www.millipore.com/publications.nsf/dda0cb48c91c0fb6852567430063b5d6/b76a969e6d73cbd5852568c5006434c9/$FILEIATTKZK5J/AD030.pdf> on Sep. 2, 2002]., Jan. 1, 1998.
Non-Final Office Action issued in U.S. Appl. No. 16/790,918 on Jan. 28, 2021.
Non-Final Office Action issued in U.S. Appl. No. 16/790,923 on Feb. 2, 2021.
Non-Final Office Action Mailed on Apr. 27, 2021 for U.S. Appl. No. 16/748,543.
Non-Final Office Action Mailed on Feb. 2, 2021 for U.S. Appl. No. 16/790,923.
Non-Final Office Action Mailed on Jan. 28, 2021 for U.S. Appl. No. 16/790,918.
Notice of Allowance and Fees Due (PTOL-85) Mailed on Aug. 13, 2024 for U.S. Appl. No. 17/674,325, 7 page(s).
Non-Final Office Action Mailed on Jun. 1, 2020 for U.S. Appl. No. 16/396,524.
Non-Final Office Action Mailed on May 10, 2022 for U.S. Appl. No. 17/247,096.
Non-Final Office Action Mailed on Nov. 4, 2021 for U.S. Appl. No. 17/247,096.
Non-Final Office Action Mailed on Oct. 14, 2022 for U.S. Appl. No. 17/247,096.
Non-Final Office Action Mailed on Oct. 26, 2022 for U.S. Appl. No. 17/410,682.
Non-Final Office Action Mailed on Sep. 30, 2021 for U.S. Appl. No. 16/790,924.

(56) References Cited

OTHER PUBLICATIONS

Non-Final Office Action received for U.S. Appl. No. 16/790,924, mailed on Sep. 30, 2021, 18 pages.
Non-Final Office Action received for U.S. Appl. No. 17/028,635, mailed on Sep. 15, 2021, 13 pages.
Non-Final Office Action received for U.S. Appl. No. 17/247,096, mailed on Nov. 4, 2021, 13 pages.
Non-Final Rejection Mailed on Apr. 27, 2021 for U.S. Appl. No. 16/748,543.
Non-Final Rejection Mailed on Feb. 2, 2021 for U.S. Appl. No. 16/790,923.
Non-Final Rejection Mailed on Jan. 23, 2023 for U.S. Appl. No. 17/314,420.
Non-Final Rejection Mailed on Jul. 17, 2023 for U.S. Appl. No. 17/247,096, 8 page(s).
Non-Final Rejection Mailed on Jun. 1, 2020 for U.S. Appl. No. 16/396,524.
Non-Final Rejection Mailed on Jun. 1, 2020 for U.S. Appl. No. 16/396,524, 11 page(s).
Non-Final Rejection Mailed on Mar. 16, 2023 for U.S. Appl. No. 17/080,344, 11 page(s).
Non-Final Rejection Mailed on May 10, 2022 for U.S. Appl. No. 17/247,096, 8 page(s).
Non-Final Rejection Mailed on Nov. 4, 2021 for U.S. Appl. No. 17/247,096, 12 page(s).
Non-Final Rejection Mailed on Nov. 27, 2023 for U.S. Appl. No. 17/314,420, 9 page(s).
Non-Final Rejection Mailed on Oct. 14, 2022 for U.S. Appl. No. 17/247,096, 14 page(s).
Non-Final Rejection Mailed on Oct. 23, 2023 for U.S. Appl. No. 17/319,746, 23 page(s).
Non-Final Rejection Mailed on Sep. 6, 2023 for U.S. Appl. No. 17/314,420, 10 page(s).
Non-Final Rejection Mailed on Sep. 6, 2023 for U.S. Appl. No. 17/674,325, 15 page(s).
Non-Final Rejection Mailed on Sep. 30, 2021 for U.S. Appl. No. 16/790,924.
Notice of Allowance (PTOL-37) Mailed on Jun. 11, 2021 for U.S. Appl. No. 16/790,923.
Notice of Allowance and Fees Due (PTOL-85) Mailed on Apr. 6, 2022 for U.S. Appl. No. 17/247,096, 4 page(s).
Notice of Allowance and Fees Due (PTOL-85) Mailed on Apr. 15, 2022 for U.S. Appl. No. 17/028,635.
Notice of Allowance and Fees Due (PTOL-85) Mailed on Apr. 19, 2023 for U.S. Appl. No. 17/805,072, 11 page(s).
Notice of Allowance and Fees Due (PTOL-85) Mailed on Apr. 6, 2022 for U.S. Appl. No. 17/247,096.
Notice of Allowance and Fees Due (PTOL-85) Mailed on Aug. 10, 2023 for U.S. Appl. No. 17/410,682, 8 page(s).
Notice of Allowance and Fees Due (PTOL-85) Mailed on Aug. 14, 2023 for U.S. Appl. No. 17/805,072, 2 page(s).
Notice of Allowance and Fees Due (PTOL-85) Mailed on Aug. 18, 2021 for U.S. Appl. No. 16/790,918.
Notice of Allowance and Fees Due (PTOL-85) Mailed on Aug. 24, 2021 for U.S. Appl. No. 16/748,543.
Notice of Allowance and Fees Due (PTOL-85) Mailed on Dec. 4, 2023 for U.S. Appl. No. 17/410,682, 3 page(s).
Notice of Allowance and Fees Due (PTOL-85) Mailed on Dec. 26, 2023 for U.S. Appl. No. 17/247,096, 2 page(s).
Notice of Allowance and Fees Due (PTOL-85) Mailed on Dec. 3, 2021 for U.S. Appl. No. 16/748,543.
Notice of Allowance and Fees Due (PTOL-85) Mailed on Dec. 30, 2022 for U.S. Appl. No. 17/805,072.
Notice of Allowance and Fees Due (PTOL-85) Mailed on Feb. 16, 2024 for U.S. Appl. No. 17/805,072, 2 page(s).
Notice of Allowance and Fees Due (PTOL-85) Mailed on Feb. 18, 2022 for U.S. Appl. No. 17/247,096, 9 page(s).
Notice of Allowance and Fees Due (PTOL-85) Mailed on Jan. 5, 2024 for U.S. Appl. No. 17/247,096, 2 page(s).
Notice of Allowance and Fees Due (PTOL-85) Mailed on Jan. 19, 2024 for U.S. Appl. No. 17/410,682, 3 page(s).
Notice of Allowance and Fees Due (PTOL-85) Mailed on Jan. 25, 2022 for U.S. Appl. No. 16/790,923.
Notice of Allowance and Fees Due (PTOL-85) Mailed on Jan. 31, 2024 for U.S. Appl. No. 17/674,325, 2 page(s).
Notice of Allowance and Fees Due (PTOL-85) Mailed on Jul. 10, 2023 for U.S. Appl. No. 17/080,344, 6 page(s).
Notice of Allowance and Fees Due (PTOL-85) Mailed on Jun. 11, 2021 for U.S. Appl. No. 16/790,923.
Notice of Allowance and Fees Due (PTOL-85) Mailed on Jun. 13, 2023 for U.S. Appl. No. 17/410,682, 8 page(s).
Notice of Allowance and Fees Due (PTOL-85) Mailed on Jun. 2, 2020 for U.S. Appl. No. 16/530,496.
Notice of Allowance and Fees Due (PTOL-85) Mailed on Jun. 20, 2023 for U.S. Appl. No. 17/805,072, 10 page(s).
Non-Final Rejection Mailed on Jul. 1, 2024 for U.S. Appl. No. 17/805,072, 17 page(s).
Advisory Action (PTOL-303) Mailed on Jul. 24, 2023 for U.S. Appl. No. 17/314,420, 3 page(s).
Air Sampling Filter Cassette Housings, [online], [retrieved Feb. 11, 2020_ <URL: https://www.zefon.com/cassette-housings> (10 pages).
Allergenco-D & Allergenco-D Posi-Track [online], [retrieved Feb. 11, 2020_ <URL: https://www.emssales.net/media/wysiwyg/uploads/ad_peer_reviewed_study.pdf> 9 pages.
CN Notification to Grant Mailed on Mar. 17, 2022for CN Application No. 202010767051.2, 6 page(s).
CN Office Action—Decision of Rejection Mailed on Dec. 11, 2023 for CN Application No. 202010341234, 8 page(s).
CN Office Action Mailed on Jan. 6, 2022 for CN Application No. 202010767051.2, 3 page(s).
CN Office Action Mailed on Jul. 7, 2023 for CN Application No. 202010341234, 6 page(s).
CN Office Action, including Search Report Mailed on Nov. 4, 2023 for CN Application No. 202110187527, 6 page(s).
CN Office Action, including Search Report Mailed on Nov. 15, 2023 for CN Application No. 202110188303, 7 page(s).
CN Office Action, including Search Report Mailed on Nov. 20, 2023 for CN Application No. 202110080239, 5 page(s).
CN Office Action, including Search Report Mailed on Oct. 13, 2023 for CN Application No. 202110188035, 10 page(s).
CN Office Action, including Search Report, Mailed on Jul. 27, 2021 for CN Application No. 202010767051.2, 13 page(s).
CN Search Report Mailed on Jul. 19, 2021for CN Application No. 202010341234.
Communication about intention to grant a European patent received for European Application No. 20170458.2, mailed on Oct. 12, 2022, 6 pages.
Communication Pursuant to Article 94(3) issued in European Application No. 20188262.8 on Oct. 7, 2021, 6 pages.
Decision to grant a European patent Mailed on Dec. 8, 2023 for EP Application No. 21154848, 2 page(s).
Decision to grant a European patent Mailed on Feb. 23, 2023 for EP Application No. 20170458.2.
Decision to grant a European patent Mailed on Sep. 7, 2023 for EP Application No. 20188262, 2 page(s).
Decision to Grant issued in Japanese Application No. 2020-129927 on Sep. 10, 2021, 5 pages.
English translation for Office Action for CN Application No. 202010341234.8 issued Jan. 4, 2023.
English Translation of CN Office Action—Decision of Rejection dated Dec. 11, 2023 for CN Application No. 202010341234, 10 page(s).
English Translation of CN Office Action dated Jan. 4, 2023 for CN Application No. 202010341234, 10 page(s).
English Translation of CN Office Action dated Jul. 7, 2023 for CN Application No. 202010341234, 10 page(s).
English Translation of CN Office Action dated Nov. 4, 2023 for CN Application No. 202110187527, 1 page(s).
English Translation of CN Office Action dated Nov. 15, 2023 for CN Application No. 202110188303, 4 page(s).
English Translation of CN Office Action dated Oct. 13, 2023 for CN Application No. 202110188035, 6 page(s).

(56) References Cited

OTHER PUBLICATIONS

English Translation of CN Office Action Mailed on Jan. 6, 2022 for CN Application No. 202010767051.2, 5 page(s).
English Translation of CN Office Action Mailed on Jul. 27, 2021 for CN Application No. 202010341234.
English Translation of CN Office Action, including Search Report dated Nov. 20, 2023 for CN Application No. 202110080239, 5 page(s).
English translation of CN Search report dated Nov. 4, 2023 for CN Application No. 202110187527, 3 page(s).
English translation of CN Search report dated Nov. 15, 2023 for CN Application No. 202110188303, 2 page(s).
English translation of CN Search report dated Oct. 13, 2023 for CN Application No. 202110188035, 3 page(s).
English translation of JP Decision to Grant dated Oct. 17, 2023 for JP Application No. 2022117842, 3 page(s).
English translation of JP Decision to Grant Mailed on Apr. 22, 2022 for JP Application No. 2021016701.
English Translation of JP Office Action dated Sep. 20, 2023 for JP Application No. 2022180787, 3 page(s).
English Translation of JP Office Action Mailed on Apr. 19, 2022 for JP Application No. 2021017841.
English translation of JP Office Action Mailed on Dec. 13, 2021for JP Application No. 2021017841.
English translation of JP Office Action Mailed on Dec. 21, 2021for JP Application No. 2021017841.
English translation of JP Search report Mailed on Dec. 13, 2021 for JP Application No. 2021016701.
EP Office Action Mailed on Jul. 19, 2023 for EP Application No. 21151236, 8 page(s).
EP Office Action Mailed on Jul. 19, 2023 for EP Application No. 21155330, 7 page(s).
European search opinion Mailed on Dec. 8, 2020 for EP Application No. 20188262.8, 1 page.
European Search Report and Search Opinion Received for EP Application No. 20211654.7, mailed on May 3, 2021, 11 pages.
European Search Report and Search Opinion received for EP Application No. 21151236.3, mailed on Jul. 26, 2021, 14 pages.
European Search Report and Search Opinion Received for EP Application No. 21154848.2, mailed on Jul. 9, 2021, 14 pages.
European Search Report and Search Opinion Received for EP Application No. 21155330.0, mailed on Jul. 19, 2021, 11 pages.
European Search Report and Search Opinion Received for EP Application No. 21156433.1, mailed on Jul. 14, 2021, 7 pages.
European search report Mailed on Dec. 8, 2020 for EP Application No. 20188262.
European search report Mailed on Dec. 8, 2020 for EP Application No. 20188262.8, 2 pages.
CN Notice of Allowance Mailed on May 13, 2024 for CN Application No. 202110188035, 3 page(s).
CN Office Action, including Search Report Mailed on Jul. 20, 2024 for CN Application No. 202110080239, 6 page(s).
Decision to grant a European patent Mailed on Jul. 11, 2024 for EP Application No. 21204589, 2 page(s).
Decision to grant a European patent Mailed on Jun. 13, 2024 for EP Application No. 21193185, 2 page(s).
English Translation of CN Office Action, including Search Report dated Jul. 20, 2024 for CN Application No. 202110080239, 6 page(s).
English Translation of JP Office Action dated Jul. 11, 2024 for JP Application No. 2023130726, 2 page(s).
English Translation of JP Office Action dated Jun. 3, 2024 for JP Application No. 2021137874, 3 page(s).
JP Office Action Mailed on Jul. 11, 2024 for JP Application No. 2023130726, 2 page(s).
JP Office Action Mailed on Jun. 3, 2024 for JP Application No. 2021137874, 3 page(s).
CN Notice of Allowance Mailed on Apr. 10, 2024 for CN Application No. 202110187527, 2 page(s).
Communication about intention to grant a European patent Mailed on Mar. 7, 2024 for EP Application No. 21204589, 6 page(s).
English translation of CN Notice of Allowance dated Apr. 10, 2024 for CN Application No. 202110187527, 3 page(s).
European search report and search opinion Mailed on Mar. 11, 2024 for EP Application No. 23215872, 13 page(s).
Intention to grant Mailed on Feb. 20, 2024 for EP Application No. 21193185, 6 page(s).
JP Decision to Grant Mailed on Mar. 1, 2024 for JP Application No. 2022180787, 5 page(s).
JP Office Action Mailed on Feb. 26, 2024 for JP Application No. 2021137874, 12 page(s).
Non-Final Rejection Mailed on Apr. 22, 2024 for U.S. Appl. No. 17/674,325, 10 page(s).
Notice of Allowance and Fees Due (PTOL-85) Mailed on Apr. 15, 2024 for U.S. Appl. No. 18/471,167, 14 page(s).
Non-Final Rejection Mailed on May 3, 2024 for U.S. Appl. No. 18/484,297, 11 page(s).
Non-Final Rejection Mailed on Sep. 19, 2024 for U.S. Appl. No. 18/471,167, 31 page(s).
Notice of Allowance and Fees Due (PTOL-85) Mailed on Sep. 18, 2024 for U.S. Appl. No. 18/484,297, 6 page(s).
CN Office Action Mailed on Aug. 28, 2024 for CN Application No. 202010341234, 6 page(s).
English Translation of CN Office Action dated Aug. 28, 2024 for CN Application No. 202010341234, 7 page(s).
English translation of JP Decision to Grant dated Sep. 9, 2024 for JP Application No. 2021137874, 2 page(s).
JP Decision to Grant Mailed on Sep. 9, 2024 for JP Application No. 2021137874, 3 page(s).
CN Office Action Mailed on Oct. 17, 2024 for CN Application No. 202010341234, 7 page(s).
English Translation of CN Office Action dated Oct. 17, 2024 for CN Application No. 202010341234, 7 page(s).
Extended European Search Report Mailed on Oct. 18, 2024 for EP Application No. 24188454, 5 page(s).
Intention to grant Mailed on Oct. 17, 2024 for EP Application No. 22182866, 8 page(s).
European search report Mailed on Nov. 13, 2024 for EP Application No. 24174131, 10 page(s).
CN Notice of Allowance Mailed on Nov. 29, 2024 for CN Application No. 202110080239, 2 page(s).
English translation of CN Notice of Allowance dated Nov. 29, 2024 for CN Application No. 202110080239, 2 page(s).
Non-Final Rejection Mailed on Dec. 18, 2024 for U.S. Appl. No. 17/805,072, 30 page(s).
CN Notice of Allowance Mailed on Jan. 9, 2025 for CN Application No. 202110188303, 2 page(s).
English translation of CN Notice of Alowance dated Jan. 9, 2025 for CN Application No. 202110188303, 2 page(s).
JP Office Action dated Nov. 8, 2024 for JP Application No. 2023195065, w/English translation, 8 page(s).

* cited by examiner

FLOW DEVICE AND ASSOCIATED METHOD AND SYSTEM

CROSS-REFERENCE TO RELATED APPLICATIONS

This application is a continuation of U.S. patent application Ser. No. 17/247,096 filed Nov. 30, 2020, which is a continuation of U.S. patent application Ser. No. 16/396,524 filed Apr. 26, 2019, each of which is incorporated herein by reference in its entirety.

TECHNOLOGICAL FIELD

An example embodiment relates generally to devices used to trigger the image acquisition system of a fluid composition sensor and the associated method of controlling the trigger devices and, more particularly, to triggering devices based on determining the fluid particle composition.

BACKGROUND

Sensors are used in various environments to monitor air conditions. Some environments require sophisticated monitoring that necessitates identifying airborne particles by collecting and imaging those particles within a sensor, such as a field portable microscope. The analysis of the microscopic image performed by a human or automatically by sophisticated image analysis software. This analysis is time consumptive; therefore constant monitoring is not preferred. It is advantageous to only perform the image analysis after a statistically relevant number of particles have accumulated in the imaged area. The varying amount of particles present in air at any time and location, makes simple timing mechanisms unable to reliably predict when a relevant number of particles have accumulated. Various current field portable microscopes are configured to activate and monitor the air at regular intervals. Applicant has identified a number of deficiencies and problems associated with these current sensors. For example, the composition of the air can change dramatically between intervals, and therefore defined intervals may be unable to fully characterize the content of the air. Through applied effort, ingenuity, and innovation, many of these identified problems have been solved by the methods, systems, and flow devices of the present disclosure.

BRIEF SUMMARY

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, a method is provided for controlling a flow device. The method includes monitoring, via a fluid sensor, signal pulses received by the fluid sensor based upon the presence of one or more particles carried by fluid flowing through the fluid sensor. The method also includes generating a control signal for an external device upon determining that the signal pulses satisfy one or more particle criteria. The one or more particle criteria defines at least one of a threshold number of signal pulses indicative of the presence of one or more particles received by the fluid sensor or a threshold size of at least one signal pulse received by the fluid sensor.

In some embodiments, the monitoring of the fluid sensor is continuous. In some embodiments, the method also includes causing a fluid composition sensor to be powered based on the control signal. The method further includes capturing, via the fluid composition sensor, data relating to the fluid particle composition. The method still further includes generating one or more particle profiles of at least one component of the fluid based on the data captured by the fluid composition sensor. In some embodiments, the fluid sensor is an optical scanning device. In some embodiments, the fluid sensor is an optical scanner and the fluid composition sensor is a lens free microscope device.

In some embodiments, the fluid sensor defines at least a portion of a fluid flow path, and wherein the fluid sensor and the fluid composition sensor are positioned along the fluid flow path such that the fluid flows through the fluid sensor before reaching the fluid composition sensor. In some embodiments, the method also includes causing the fluid composition sensor to be powered off after the one or more particle profiles have been generated.

In some embodiments, the one or more particle profiles includes at least one of a holographic image reconstruction or particle size data. In some embodiments, the method also includes determining an initial particle profile based on the monitoring by the fluid sensor. In some embodiments, each of the one or more particle profiles comprises at least one of particle images, particle size data, or particle type data of the at least one component of the fluid. In some embodiments, each of the at least one component of the fluid comprises one or more of bacteria, viruses, pollen, spores, molds, biological particles, soot, inorganic particles, and organic particles.

In some embodiments, generating the one or more particle profiles of at least one component of the fluid based on the data captured by the fluid composition sensor includes comparing one or more partial image frames with one or more reference image frames of one or more potential components of the fluid. In some embodiments, the fluid sensor and the fluid composition sensor are contained in a housing.

In another example embodiment, a flow device is provided for detecting fluid particle composition. The flow device includes a fluid sensor configured to monitor signal pulses received by the fluid sensor based upon the presence of one or more particles carried by fluid flowing through the fluid sensor. The fluid sensor is also configured to generate a control signal for an external device upon determining that the signal pulses satisfy one or more particle criteria. The one or more particle criteria defines at least one of a threshold number of signal pulses indicative of the presence of one or more particles received by the fluid sensor or a threshold size of at least one signal pulse received by the fluid sensor.

In some embodiments, the monitoring of the fluid sensor is continuous. In some embodiments, the flow device includes a fluid composition sensor. The flow device is also configured to cause the fluid composition sensor to be powered based on the control signal. The flow device is also configured to capture, via the fluid composition sensor, data relating to the fluid particle composition. The flow device is also configured to generate one or more particle profiles of at least one component of the fluid based on the data captured by the fluid composition sensor. In some embodiments, the fluid sensor is an optical scanning device. In some embodiments, the fluid sensor is an optical scanner and the fluid composition sensor is a lens free microscope device.

In some embodiments, the fluid sensor defines at least a portion of a fluid flow path, and wherein the fluid sensor and the fluid composition sensor are positioned along the fluid flow path such that the fluid flows through the fluid sensor before reaching the fluid composition sensor. In some embodiments, the flow device is also configured to cause the fluid composition sensor to be powered off after the one or more particle profiles have been generated.

In some embodiments, the one or more particle profiles includes at least one of a holographic image reconstruction or particle size data. In some embodiments, the flow device is also configured to determine an initial particle profile based on the monitoring by the fluid sensor. In some embodiments, each of the one or more particle profiles comprises at least one of particle images, particle size data, or particle type data of the at least one component of the fluid. In some embodiments, each of the at least one component of the fluid comprises one or more of bacteria, viruses, pollen, spores, molds, biological particles, soot, inorganic particles, and organic particles.

In some embodiments, generating the one or more particle profiles of at least one component of the fluid based on the data captured by the fluid composition sensor includes comparing one or more partial image frames with one or more reference image frames of one or more potential components of the fluid. In some embodiments, the fluid sensor and the fluid composition sensor are contained in a housing.

In still another example embodiment, a system is provided for determining the fluid particle composition flowing through a path. The system includes a fluid sensor configured to monitor at least one particle characteristic of a fluid flowing through the fluid sensor and along the path. The system also includes a fluid composition sensor configured to capture data relating to at least one particle characteristic of the fluid flowing along the path, wherein the fluid composition sensor is located downstream of the fluid sensor along the path. The fluid composition sensor remains unpowered until a particle criteria is satisfied by the fluid flowing through the fluid sensor. The system further includes at least one processor configured to generate one or more particle profiles of at least one component of the fluid based on the data captured by the fluid composition sensor.

In some embodiments, the monitoring of the fluid sensor is continuous. In some embodiments, the fluid sensor is an optical scanner device. In some embodiments, the fluid composition sensor is a lens free microscope device. In some embodiments, the fluid composition sensor is configured to be powered off after the one or more particle profiles have been generated. In some embodiments, each of the at least one component of the fluid comprises one or more of bacteria, viruses, pollen, spores, molds, biological particles, soot, inorganic particles, and organic particles. In some embodiments, the fluid sensor and the fluid composition sensor are contained in a housing.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
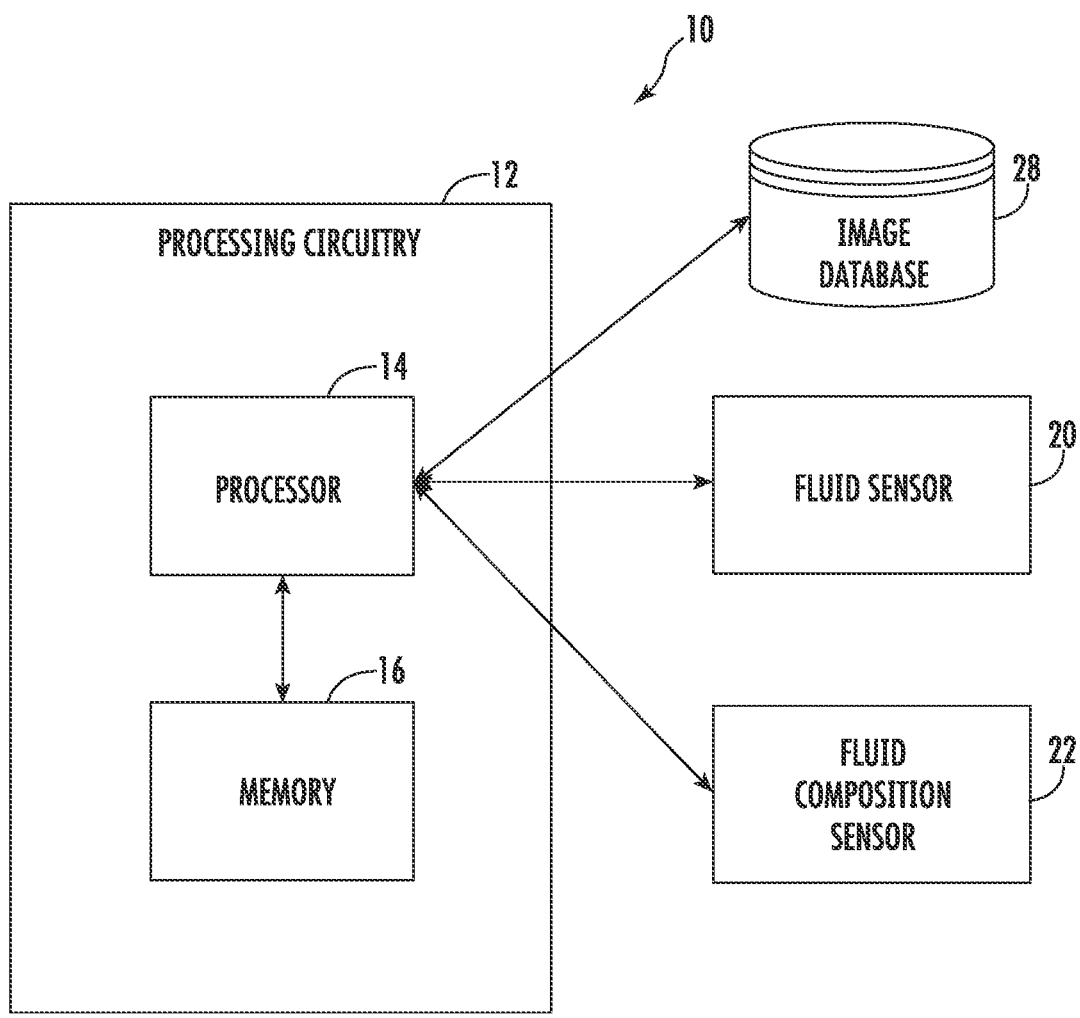
Figure 2:
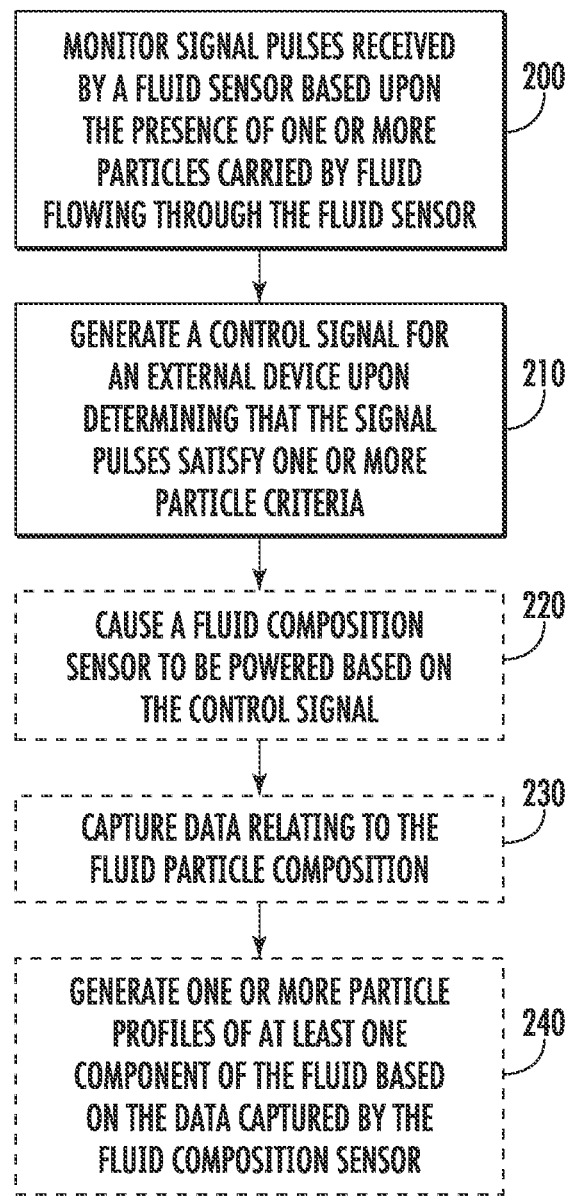
Figure 3A:
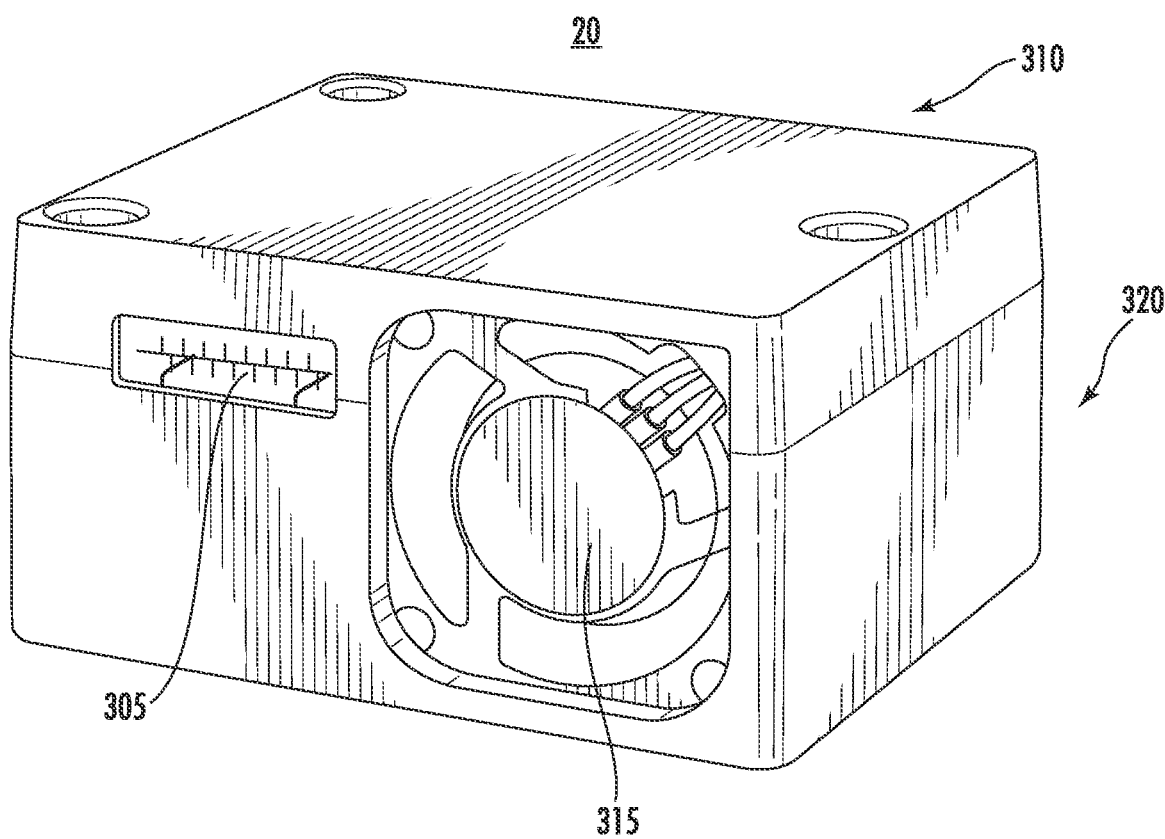
Figure 3B:
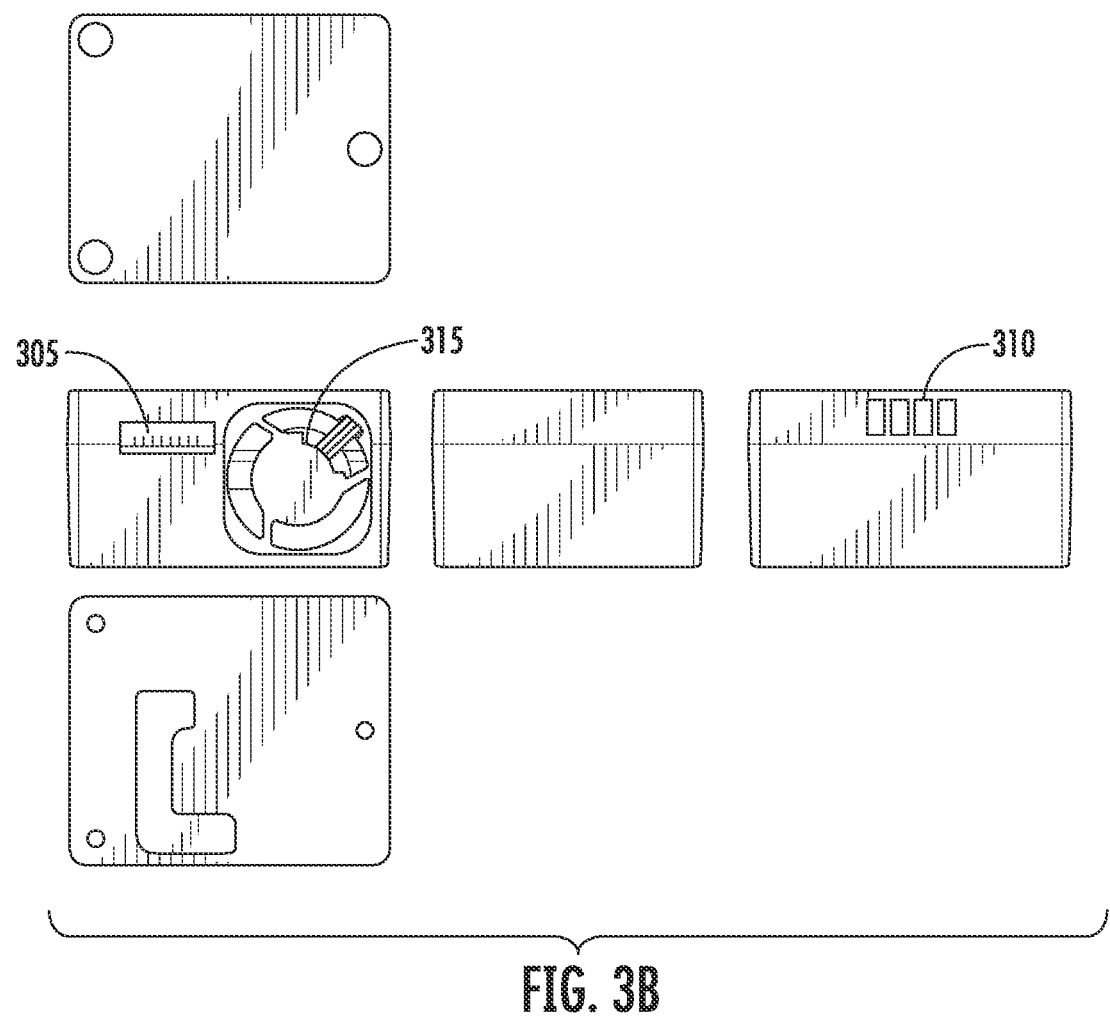
Figure 4:
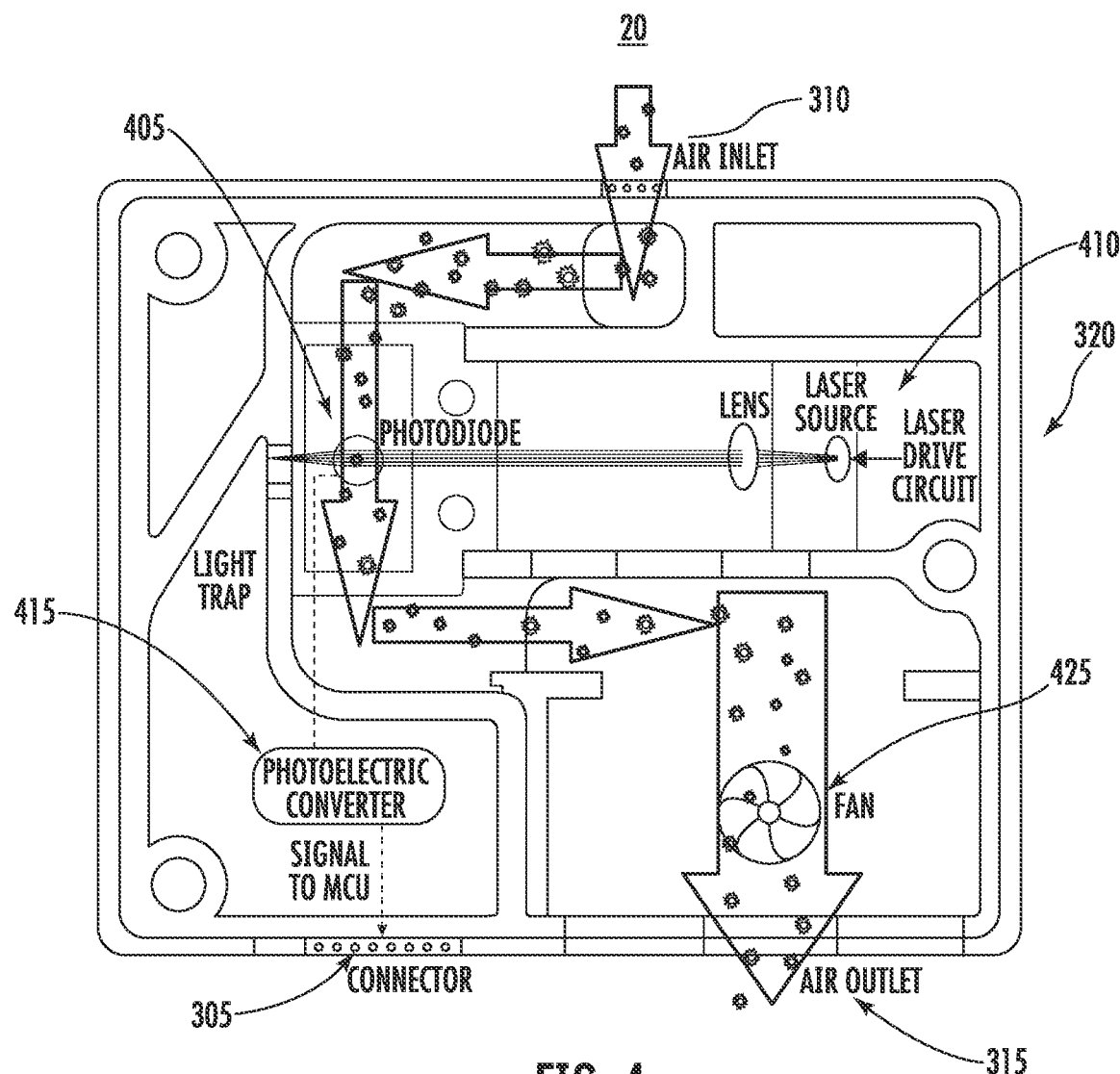
Figure 5:
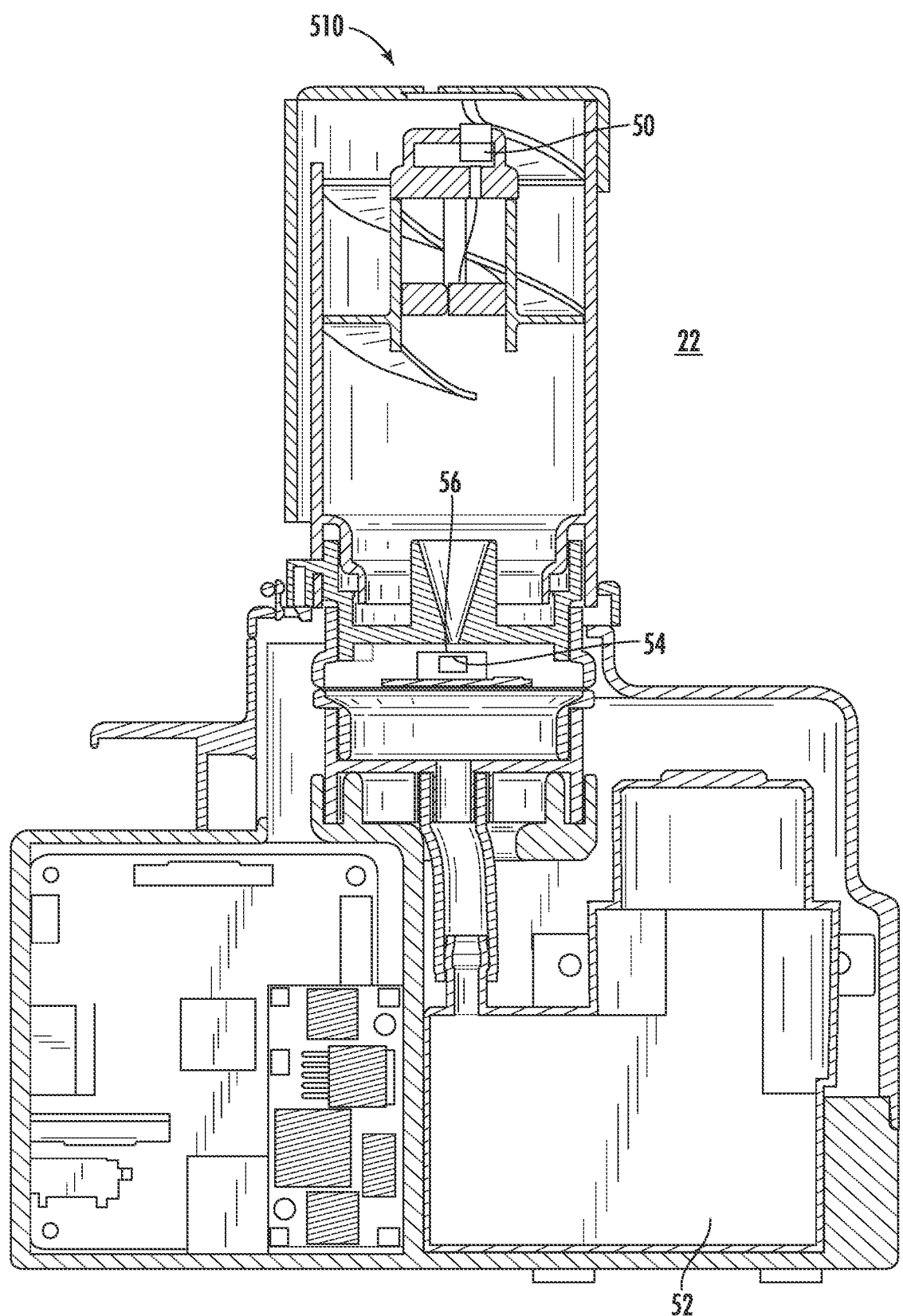
Figure 6:
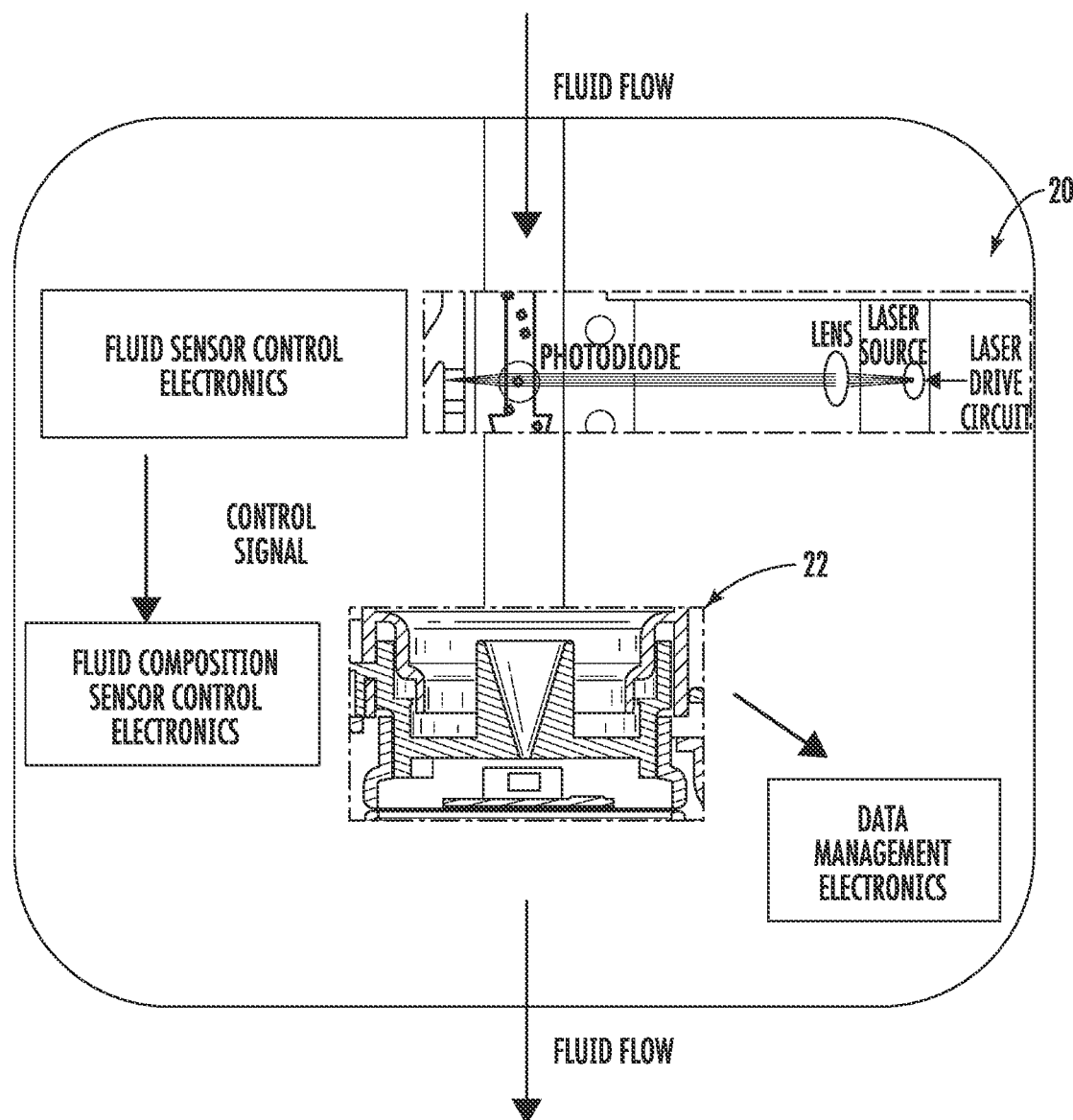

Having thus described certain example embodiments of the present disclosure in general terms, reference will hereinafter be made to the accompanying drawings, which are not necessarily drawn to scale, and wherein:

FIG. 1 is a schematic diagram of a fluid sensing system in accordance with an example embodiment of the present disclosure;

FIG. 2 is an illustrative flowchart of the operations of a flow device in accordance with an example embodiment of the present disclosure;

FIG. 3A is an exterior view of a fluid sensor in accordance with an example embodiment of the present disclosure;

FIG. 3B is multiple views of a fluid sensor in accordance with an example embodiment of the present disclosure;

FIG. 4 is a cutaway view of a fluid sensor in accordance with an example embodiment of the present disclosure;

FIG. 5 is a cutaway view of a lens free microscope device in accordance with an example embodiment of a fluid composition sensor of the present disclosure; and FIG. 6 is a cutaway view of a flow device with a fluid sensor and a fluid composition sensor in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. As used herein, a "fluid" may be embodied as a gas, a liquid, or a combination of a gas and a liquid in a single flow. Thus, the term "fluid" encompasses various materials subject to flow, such as, but not limited to, liquids and/or gases (e.g., air, oil, or the like). Thus, various embodiments are directed to fluid sensing systems, such as gas sensing systems (e.g., certain embodiments being specifically configured for operation with air; other embodiments being configured for operation with other gases, such as inert gases, volatile gases, and/or the like), liquid sensing systems, and/or the like.

Certain embodiments are directed to a fluid sensing system, a flow device, and a method of controlling a flow device for use in various environments. Because certain complex fluid sensors for monitoring fluid particle composition are not viable to operate continuously (e.g., complex air sensors are often both time and power intensive). While time-based activation—powering on the sensor at a set interval of time before depowering—may result in inaccurate, unreliable, or otherwise unrepresentative fluid particle composition testing results that do not reflect the true composition of the fluid (e.g., a volume of air) being monitored. For example, quantities of particulates within air that collectively embody the air's composition, such as pollen, can change rapidly and unpredictably over even a short period of time. Thus, monitoring the fluid particle composition only at defined time intervals may result in monitoring results that entirely omit drastic changes in the fluid's composition (e.g., drastic increases or decreases in the amount of pollen, or other particulates, in the air). Conversely, when the fluid particle composition remains relatively constant, the sensor may be powered on multiple times without any changes in measured fluid particle composition, which may result in a waste of energy in initializing the sensor to take such measurements. To overcome such difficulties, incorporating a front-end discriminating fluid sensor having near real-time detection and minimal power consumption requirements while providing continuously monitoring of the fluid allows for a reduction in overall energy consumption, while also increasing the reliability of the sensing system as a whole.

Referring now to FIG. 1, a schematic diagram of an example system 10 configured for fluid sensing is provided. The system 10 may include, be associated with, or may otherwise be in communication with a processing circuitry 12, including, for example, one or more processors 14 and one or more memory devices 16, a fluid sensor 20, a fluid composition sensor 22, and an image database 28. In various embodiments, the system 10 may be embodied by or associated with a plurality of computing devices that are in communication with or otherwise networked with one another. For example, one or both of the fluid sensor and the fluid composition sensor may have a processor in communication with the other. In various embodiments, some or all of the referenced components may be embodied as a flow device. For example, a flow device may include a processor 14, a fluid sensor 20, and, optionally, a fluid composition sensor 22. In various embodiments, the system 10 may be configured with, or in communication with, an image database 28. In some embodiments, the image database 28 may be stored, at least partially on the memory device 16 of the system. In some embodiments, the image database 28 may be remote from, but in connection with, the system 10. The image database 28 may contain information, such as images relating to one or more potential components of fluids. In some embodiments, the image database 28, and/or other similar reference databases in communication with the system 10, may comprise non-image information used to identify particles (e.g., for florescent particles, a spectrometer may be used by the fluid composition sensor 22 discussed below and the system 10 may receive spectrum information to identify and/or classify the particles). In some embodiments, the system 10 may also use machine learning for identifying and/or classifying particles, such that the system 10 may use a reference database, such as image database 28, to initially train the system 10 and then may be configured to identify and/or classify particles without referencing the image database 28 or other reference databases (e.g., a system may not be in active communication with the image database 28 during regular operations).

The fluid sensor 20 may be embodied as an air sensor comprising a particle detector comprising a light beam generator and a pulse detector, collectively configured to monitor signal pulses generated at the pulse detector based upon the presence of one or more particles carried by air flowing through the air sensor. The fluid sensor 20 may be configured as any fluid sensor capable of monitoring particle composition at or near real-time. In various embodiments, the fluid sensor 20 may be configured as an optical scanner. For example, in certain embodiments, the fluid sensor 20 may be embodied as an air sensor comprising a Honeywell HPM Series Particulate Matter Sensor, in combination with a processor configured for generating control signals as discussed herein. Referring now to FIGS. 3A and 3B, the fluid sensor 20 may be embodied as an air sensor have a casing 320 configured with one or more intake slots 310 and one or more exhaust slots 315 configured such that the air enters the fluid sensor 20 through the one or more intakes slots 310. As will be discussed in reference to FIG. 4, the air travels through the fluid sensor 20 and exits through one or more exhaust slots 315. In some embodiments, the fluid sensor 20 may be configured with an electrical connector port 305 configured to transmit electrical signals and/or data signals (e.g., control signals) to and/or from the fluid sensor (e.g., the electrical signal may comprise a power signal provided from an external power source to the fluid sensor, and/or a data signal may comprise data indicative of detected characteristics of the fluid flowing through the sensor, the data signal may be transmitted from the fluid sensor to another system component). In some embodiments, the fluid sensor 20 may be powered through the electrical connector port 305. Alternatively, the fluid sensor 20 may be battery powered. In some embodiments, some or all of the processor(s) 14 associated with the fluid sensor 20 may be contained in the casing 320. In some embodiments, the electrical connector port 305 may connect the fluid sensor 20 to at least a portion of the processor(s) 14 associated with the fluid sensor. In some embodiments, the control signal created based on the fluid travelling through the fluid sensor 20 may be transmitted through the electrical connector port 305. In various embodiments, the fluid sensor 20 may be relatively small in comparison to the fluid composition sensor 22. For example, the fluid sensor may be less than 2 inches wide by 2 inches long by 1 inch thick. In some embodiments, the fluid sensor 20 may be larger or smaller based on the size of the components used and the use of the sensing system. For example, the system 10 may be packaged in a flow device, such that the flow device may be portable from one environment to another.

As shown in FIG. 4, the fluid sensor 20 may be an optical scanning device. In some embodiments, the fluid sensor 20 may be equipped with a beam generator, such as the illustrated illumination source 410 and a pulse detector, such as the illustrated photodiode element 405, each of which may be positioned within a detection cavity of the fluid sensor 20 that is positioned within the fluid flow path extending through the fluid sensor 20 (e.g., positioned within an air flow path of an air sensor). Additionally, the fluid sensor 20 may be configured with a photoelectric converter 415. In various embodiments, the illumination source may be a laser, lamp, light-emitting diode (LED), or the like, which may operate in connection with one or more lenses collectively configured to generate a light beam (e.g., ultraviolet, visible, infrared, or multiple color light) directed across the fluid flow path passing through the detection cavity of the sensor. Specifically, the light beam may be detected across the fluid flow path, from the illumination source 410 to a light trap configured to absorb light to minimize the amount of light reflected off of components of the fluid sensor 20 and back toward the fluid flow path (which may inaccurately duplicate some measurements of air characteristics). For example, the fluid sensor 20 may be configured to use laser-based light scattering particle sensing for detecting particles within air.

In an example embodiment, the fluid sensor 20 may be configured with a fan 425 used to draw air into the fluid sensor inlet 310 and through the fluid sensor. In some embodiments, the fluid may flow through a detection cavity enclosing the illumination source 410 (e.g., laser, lamp, LED, or the like) such that particles or other attributes of the fluid flow may reflect at least a portion of the light generated by the illumination source 410, thereby enabling the photodiode element 405 to capture the pulses of light that are reflected off of the particles in the fluid. In some embodiments, the photodiode element 405 may transmit information indicative of the light reflected off of the particles in the fluid to the photoelectric converter 415. In some embodiments, the photoelectric converter 415 is configured to generate a control signal for an external device based at least in part on data received from the photodiode element 405, for example, when a particle criteria is satisfied.

In certain embodiments, a particle criteria may be a minimum number of detected particles per volume of fluid, a minimum number of particles detected during a defined time period, a maximum number of particles detected per volume of fluid, a maximum number of particles detected during a defined time period, a minimum particle size, a minimum number of particles having a minimum and/or maximum particle size, and/or the like. In some embodiments, the particle criteria may be a threshold number of signal pulses indicative of the presence of one or more particles received by the fluid sensor 20 (specifically, signal pulses generated at the photodiode element). In some embodiments, the particle criteria may be a threshold size of at least one signal pulse received by the fluid sensor 20. In some embodiments, the particle criteria may be either a threshold number of signal pulses indicative of the presence of one or more particles received by the fluid sensor or a threshold size of at least one signal pulse received by the fluid sensor. In some embodiments, the criteria may be a set number of fluorescent particles and/or the ratio of fluorescent particles to non-fluorescent particles. In various embodiments, the external device may be the fluid composition sensor 22 or an associated processor 14. The fluid sensor 20 may be configured to transmit the control signal to the external device, such as through the connector 305.

The fluid composition sensor 22 may be configured to capture data relating to the fluid particle composition, such that one or more particle profiles of at least one component of the fluid may be generated based on the data captured by the fluid composition sensor. In certain embodiments, the fluid composition sensor 22 may have one or more illumination source, such as laser, lamp, LED, and/or the like. In some embodiments, the illumination source of the fluid composition sensor 22 may be larger than the illumination source of the fluid sensor 20, such that the illumination source of the fluid composition sensor 22 uses more electrical power than the illumination source 410 of the fluid sensor 20. In some embodiments, the fluid composition sensor 22 may be configured to capture data relating to one or more particles in fluid. In some embodiments, the fluid composition sensor 22 may be configured to capture data relating to a plurality of particles in the fluid simultaneously. For example, the fluid composition sensor 22 may have a designated field of view for capturing, permanently and/or temporarily, multiple particles simultaneously. In some embodiments, the fluid composition sensor 22 may be configured specifically for operation in detecting particular characteristics with a defined range of particles within a field of view thereof, such that the system 10 may be configured to generate the control signal when the amount of particles is within a certain range appropriate for the fluid composition sensor 22. In such an example, the particle criteria may be based on the range of particles. For example, the amount of pulses and/or the intensity of the pulses that meet the particle criteria may be based on the desired particle amount for the fluid composition sensor 22.

It should be understood that the configuration of the fluid composition sensor 22 is merely an example, and various embodiments may incorporate fluid composition sensors having other configurations for detection of characteristics of fluid via one or more mechanisms. For example, a fluid composition sensor 22 may be configured to generate particle profiles for a plurality of specific components. Alternatively, the fluid composition sensor 22 may be configured to generate a particle profile for a singular component of the fluid exclusively. For example, the fluid composition sensor 22 may only generate the particle profile of pollen in the fluid when data is captured. In some embodiments, the fluid composition sensor 22 may be a lens free microscope device, such as the one shown in FIG. 5. For example, the fluid composition sensor 22 may include one or more illumination sources 50 (e.g., laser, lamp, LED, and/or the like) and an image sensor 54 configured near a transparent substrate 56, such that the image sensor collects images of the particles that are collected on the transparent substrate. In some embodiments, the fluid composition sensor 22 may include a fan or vacuum pump 52 configured to pull the fluid into the fluid composition sensor through the fluid composition sensor intake slots 510 and through the fluid composition sensor 22. In some embodiments, the fluid composition sensor 22 may be a lens free microscope, such as one described in WIPO Publication Number 2018/165590, incorporated herein by reference. In some embodiments, the fluid composition sensor 22 may be embodied as a UV fluorescence system, a traditional microscope, Burkard samplers and traps, Allergenco sampler and greased slide, and the like.

Referring now to FIG. 2, a flowchart of the method of controlling a flow device in accordance with an example embodiment is provided. Various operations discussed below may be carried out using various components of the system. In some embodiments, the flow device may include one or more processors 14 and a fluid sensor 20. In some embodiments, the flow device may be in communication with a fluid composition sensor 22. In some embodiments, the flow device may include a fluid composition sensor 22. Various components referenced in relation to the flow device may be included with or in communication with the flow device.

Referring to Block 200 of FIG. 2, the flow device includes processor 14 for monitoring signal pulses received by the fluid sensor 20 based upon the presence of one or more particles carried by fluid flowing through the fluid sensor. As discussed above, the fluid sensor 20 may be configured with an illumination source, such as a laser, lamp, LED, or the like, and a photodiode element configured to receive pulses of light from the illumination source that has reflected off of the particles in the fluid flowing through the fluid sensor 20 and onto a detection surface of the photodiode element. In some embodiments, the fluid sensor 20 may be configured to monitor the fluid continuously. In some embodiments, the flow device may be configured to generate an initial particle profile for one or more components of the fluid based on the monitoring of the fluid sensor 20. Additionally or alternatively, the flow device may be configured to generate an initial particle profile for the fluid as a whole based on the monitoring of the fluid sensor 20. For example, the flow device may generate an initial particle density of the fluid based on the monitoring of the fluid sensor 20. In some embodiments, the fluid sensor 20 may be an optical scanner sensing device, such as shown in FIGS. 3A, 3B, and 4.

Referring now to Block 210 of FIG. 2, the flow device includes processor 14 for generating a control signal for an external device upon determining that the signal pulses satisfy one or more particle criteria. In some embodiments, the particle criteria may be a threshold number of signal pulses indicative of the presence of one or more particles received by the fluid sensor. As noted herein, the particle criteria may be a threshold size of at least one signal pulse received by the fluid sensor. In some embodiments, the particle criteria may be either a threshold number of signal pulses indicative of the presence of one or more particles received by the fluid sensor or a threshold size of at least one signal pulse received by the fluid sensor. In some embodiments, the fluid sensor 20 may act as a power switch, such that no power at all goes to the fluid composition sensor 22 until the particle criteria is met and the control signal is generated (i.e., blocking all flow of power). In some embodiments, the fluid sensor 20 may transmit the control signal to a central processor, and then the central processor may send a signal to the fluid composition sensor 22 to power-up (i.e., fluid composition sensor 22 starts using available power). In some embodiments, the fluid composition sensor 22 may be continuously powered and a central processor 14 only saves generated data after the fluid sensor 20 detects the applicable particle criteria.

In some embodiments, the control signal may comprise an electrical signal and/or a data signal. In some embodiments, the control signal may be embodied as an indication to an external device that the criteria has been satisfied. In some embodiments, the control signal may provide an estimate of the particle count in the fluid based on the monitoring of the fluid. For example, the density of the particulate in the fluid sensor may be determined and transmitted to the external device. In some embodiments, the external device may be fluid composition sensor 22 and/or associated processor 14.

Referring now to Block 220 of FIG. 2, the flow device includes processor 14 which is configured for causing a fluid composition sensor 22 to be powered based on the control signal. In some embodiments, the fluid composition sensor 22 may be configured to remain unpowered until the control signal is generated the fluid sensor. In some embodiments, the fluid composition sensor 22 may be configured to operate in a low-power mode until the control signal is generated based on the determination that the signal pulses satisfy one or more particle criteria. For example, the fluid composition sensor 22 may be powered and otherwise operational before a control signal is generated except for the data capture portion of the fluid composition sensor. The control signal may be provided to a processor 14 connected to, or otherwise in communication with, the fluid composition sensor 22. In some embodiments, the processor in communication with the fluid composition sensor 22 may be distinct from the processor used by the fluid sensor 20 to generate the control signal. For example, the fluid sensor 20 and the fluid composition sensor 22 may each have a dedicated processor. In some embodiments, a processor 14 may be in communication with the fluid sensor 20 and the fluid composition sensor 22 and the control signal may be an electrical signal providing power to the fluid composition sensor.

Referring now to Block 230 of FIG. 2, the flow device includes fluid composition sensor 22 for capturing data relating to the fluid particle composition. In some embodiments, the fluid composition sensor 22 may be positioned along the fluid flow path in such a way that at least a portion of the fluid passes through the fluid sensor 20 before reaching the fluid composition sensor 22. As discussed above in reference to the fluid composition sensor 22 discussion relating to FIG. 1, the fluid composition sensor 22 may include an illumination source, such as a laser, lamp, LED, or the like. In some embodiments, the illumination source may be configured to allow the fluid composition sensor 22 to acquire data on particles in the fluid as the particles pass through a designated field of view of the fluid composition sensor. The data captured may include at least a partial image of one or more particles in the fluid. In some embodiments, the fluid composition sensor 22 may be a lens free microscope. In various other embodiments, the fluid composition sensor 22 may be embodied as a UV fluorescence system, a traditional microscope, Burkard samplers and traps, Allergenco sampler and greased slide, and the like.

Referring now to Block 240 of FIG. 2, the flow device includes processor 14 for generating one or more particle profiles of at least one component of the fluid based on the data captured by the fluid composition sensor 22. The at least one component of fluid may comprise one or more of bacteria, viruses, pollen, spores, molds, biological particles, soot, inorganic particles, and/or organic particles. In some embodiments, the flow device may be configured to determine the particle profile of one or more specific components of the fluid each time data is captured. For example, the flow device may be configured to create a particle profile of the pollen in the air. Alternatively, the flow device may be configured to monitor for a plurality of different components of the air. For example, the flow device may be configured to monitor for all of the components listed above and to generate a particle profile for one or more components (e.g., individually) that may be present in the air.

Referring now to FIG. 6, an example flow device with a fluid senor 20 and a fluid composition sensor 22 in the same housing in accordance with an example embodiment of the present disclosure is schematically illustrated. It should be understood that configurations, including configurations of the fluid flow path, the overall shape and/or size of the flow device, and/or the like may vary in accordance with certain embodiments. As shown, the flow device may define a flow path from an intake end to an output end, such that at least a portion of the air that reaches the fluid composition sensor 22 has passed through the fluid sensor 20 first. In some embodiments, the fluid sensor 20 and the fluid sensor 22 may share one or more common components. For example, the same suction device (e.g., fan, vacuum pump, and/or the like) may be used to direct the fluid flow in the flow path instead of individual suction devices for each sensor. Alternatively, the fluid sensor 20 and the fluid composition sensor 22 may each have individual components, such as shown in FIGS. 4 and 5 displaying the components of each individual component. Additionally, as shown in FIG. 6, each sensor may have a dedicated processor (e.g., fluid sensor control electronics for the fluid sensor 20 and fluid composition sensor control electronics for the fluid composition sensor 22). In some embodiments, the flow device may have additional processors (e.g., data management electronics) configured to carryout processes described herein.

In some embodiments, the one or more particle profiles may include at least one of particle images, particle size data, or particle type data of the at least one component of the fluid (e.g., at least one particle component of air). In some embodiments, the one or more particle profiles may include at least one of a holographic image reconstruction. In some embodiments, a particle profile generated by the flow device may be based on a comparison of one or more partial image frames with one or more reference image frames of one or more potential components of the fluid. In some embodiments, the reference image(s) may be received from the image database 28. In some embodiments, the fluid composition sensor 22 may be configured to return to the unpowered state after one or more particle profiles have been generated. In such an embodiment, the fluid sensor 20 may continue to monitor the fluid even after the fluid composition sensor 22 returns to an unpowered state.

As described above, FIG. 2 illustrates a flowchart of the operations of a flow device, method, and system according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 16 of a software development test platform employing an embodiment of the present invention and executed by the processing circuitry 12, the processor 14 or the like of the software development test platform. As will be appreciated, any such computer program instructions may be loaded onto a computer or other programmable flow device (e.g., hardware) to produce a machine, such that the resulting computer or other programmable flow device implements the functions specified in the flowchart blocks. These computer program instructions may also be stored in a computer-readable memory that may direct a computer or other programmable flow device to function in a particular manner, such that the instructions stored in the computer-readable memory produce an article of manufacture the execution of which implements the function specified in the flowchart blocks. The computer program instructions may also be loaded onto a computer or other programmable flow device to cause a series of operations to be performed on the computer or other programmable flow device to produce a computer-implemented process such that the instructions which execute on the computer or other programmable flow device provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for controlling a flow device, the method comprising:
   monitoring, via a fluid sensor, signal pulses received by the fluid sensor based upon the presence of one or more particles carried by fluid flowing through the fluid sensor;
   upon determining that the signal pulses satisfy one or more particle criteria, generating a control signal for an external device;
   based on the control signal, causing a fluid composition sensor to be powered;
   capturing, via the fluid composition sensor, an at least partial image of one or more particles in the fluid;
   comparing the at least partial image captured by the fluid composition sensor with one or more reference image frames of one or more potential components of the fluid; and
   generating one or more particle profiles of at least one component of the fluid based on the comparison.

2. The method of claim 1, wherein the monitoring of the fluid sensor is continuous.

3. The method of claim 1, wherein the one or more particle criteria defines at least one of: a threshold number of signal pulses indicative of the presence of one or more particles received by the fluid sensor or a threshold size of at least one signal pulse received by the fluid sensor.

4. The method of claim 1, wherein the fluid sensor is an optical scanner device.

5. The method of claim 1, wherein the fluid sensor is an optical scanner device, and the fluid composition sensor is a lens free microscope device.

6. The method of claim 1, wherein the fluid sensor defines at least a portion of a fluid flow path, and wherein the fluid sensor and the fluid composition sensor are positioned along the fluid flow path such that the fluid flows through the fluid sensor before reaching the fluid composition sensor.

7. The method of claim 1, further comprising causing the fluid composition sensor to be powered off after the one or more particle profiles have been generated.

8. The method of claim 1, wherein the one or more particle profiles comprises at least one of a holographic image reconstruction or particle size data.

9. The method of claim 1 further comprising determining an initial particle profile based on the monitoring by the fluid sensor.

10. The method of claim 1, wherein each of the one or more particle profiles comprises at least one of particle images, particle size data, or particle type data of the at least one component of the fluid.

11. The method of claim 1, wherein each of the at least one component of the fluid comprises one or more of bacteria, viruses, pollen, spores, molds, biological particles, soot, inorganic particles, and organic particles.

12. The method of claim 1, wherein the fluid sensor and the fluid composition sensor are contained in a housing.

13. A flow device for detecting fluid particle composition comprising:
   a fluid sensor configured to:
      monitor at least one particle characteristic of fluid flowing through the fluid sensor;

a processor configured to, upon determining the at least one particle characteristic satisfies a particle criteria, generate a control signal for an external device; and a fluid composition sensor configured to be powered based on the control signal, and capture an at least partial image of one or more particles in the fluid, wherein the flow device further configured to compare the at least partial image captured by the fluid composition sensor with one or more reference image frames of one or more potential components of the fluid, and generate one or more particle profiles of at least one component of the fluid based on the comparison.

14. The flow device of claim 13, wherein the monitoring of the fluid sensor is continuous.

15. The flow device of claim 13, wherein the one or more particle criteria defines at least one of: a threshold number of signal pulses indicative of the presence of one or more particles received by the fluid sensor or a threshold size of at least one signal pulse received by the fluid sensor.

16. The flow device of claim 13, wherein the fluid sensor is an optical scanner device.

17. The flow device of claim 13, wherein the fluid sensor is an optical scanner device, and the fluid composition sensor is a lens free microscope device.

18. The flow device of claim 13, wherein the fluid is configured to flow along a fluid flow path, and wherein the fluid sensor and the fluid composition sensor are positioned along the fluid flow path such that the fluid flows through the fluid sensor before reaching the fluid composition sensor.

19. The flow device of claim 13, wherein each of the at least one component of the fluid comprises one or more of bacteria, viruses, pollen, spores, molds, biological particles, soot, inorganic particles, and organic particles.

20. A system for determining the fluid particle composition flowing through a path comprising:

a fluid sensor configured to monitor at least one particle characteristic of a fluid flowing through the fluid sensor and along the path;

a fluid composition sensor configured to capture an at least partial image of one or more particles in the fluid, wherein the fluid composition sensor is located downstream of the fluid sensor along the path, wherein the fluid composition sensor remains unpowered until a particle criteria is satisfied by the fluid flowing through the fluid sensor; and at least one processor configured to generate one or more particle profiles of at least one component of the fluid based on comparison of the at least partial image captured by the fluid composition sensor with one or more reference image frames of one or more potential components of the fluid.

* * * * *